March 10, 1936. E. E. TURNER, JR 2,033,160
METHOD AND APPARATUS FOR MEASURING DEPTHS
Filed April 17, 1928 6 Sheets-Sheet 1

INVENTOR.
Edwin E. Turner Jr.
BY
Ezekiel Wolf
ATTORNEY.

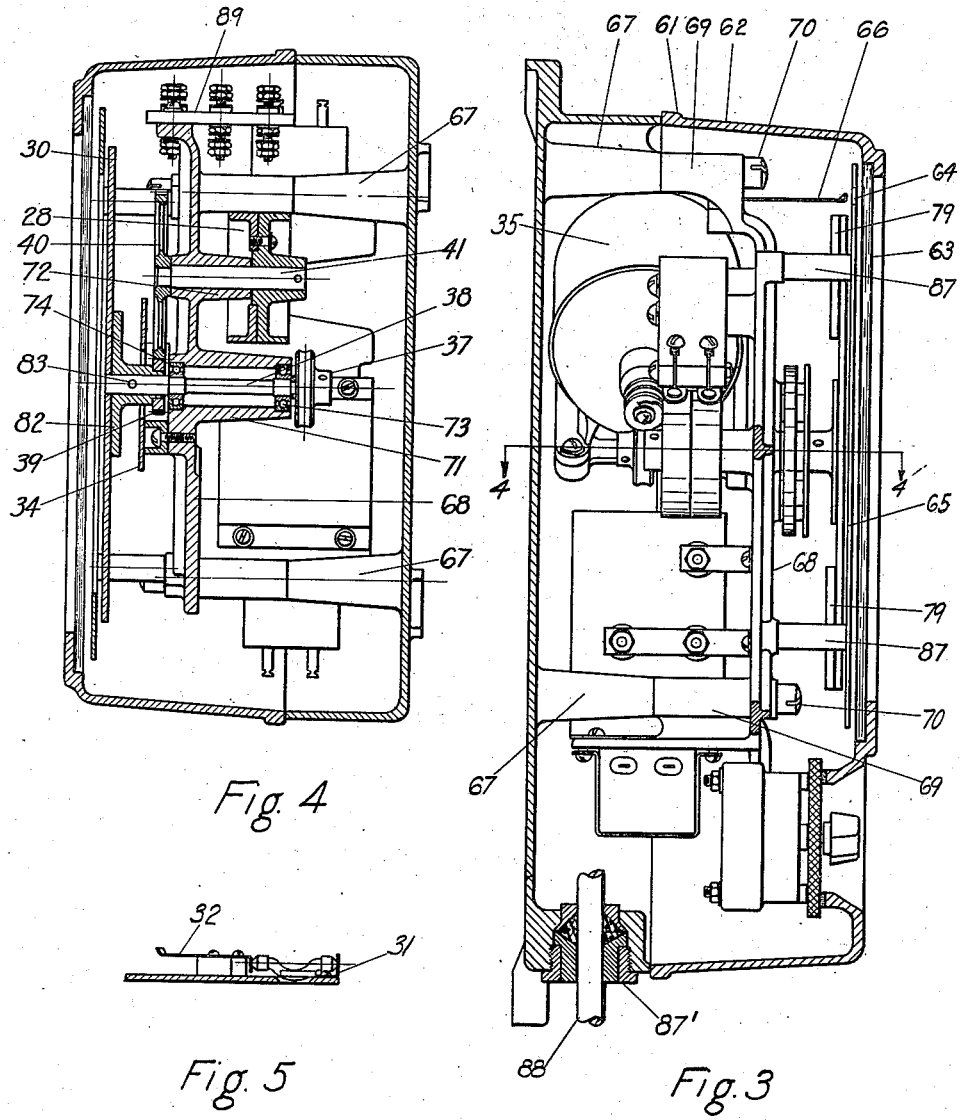

March 10, 1936.   E. E. TURNER, JR   2,033,160
METHOD AND APPARATUS FOR MEASURING DEPTHS
Filed April 17, 1928   6 Sheets-Sheet 4

INVENTOR.
Edwin E. Turner Jr.
BY
ATTORNEY.

March 10, 1936.  E. E. TURNER, JR  2,033,160
METHOD AND APPARATUS FOR MEASURING DEPTHS
Filed April 17, 1928  6 Sheets-Sheet 5
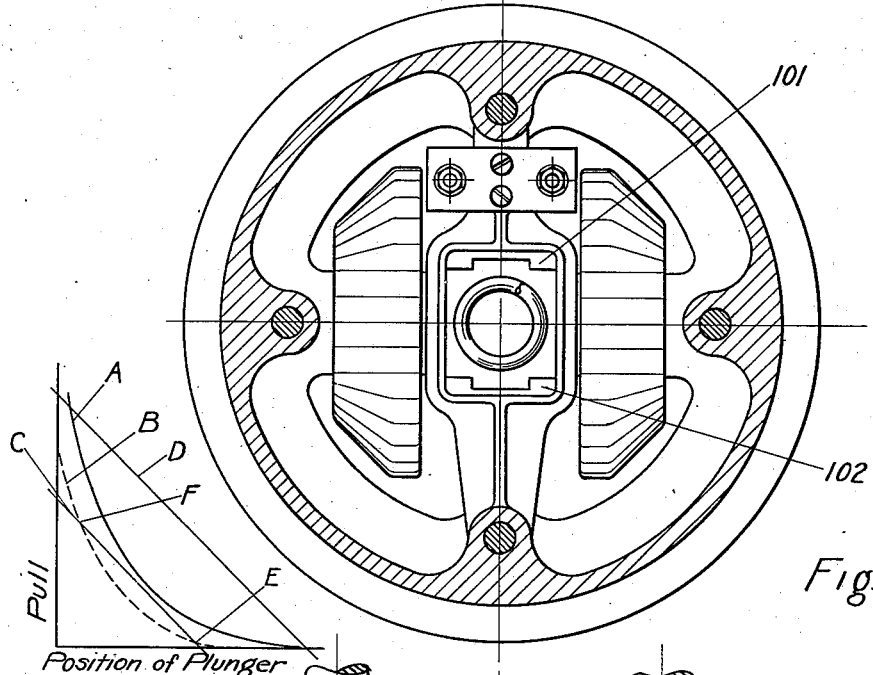
Fig. 8
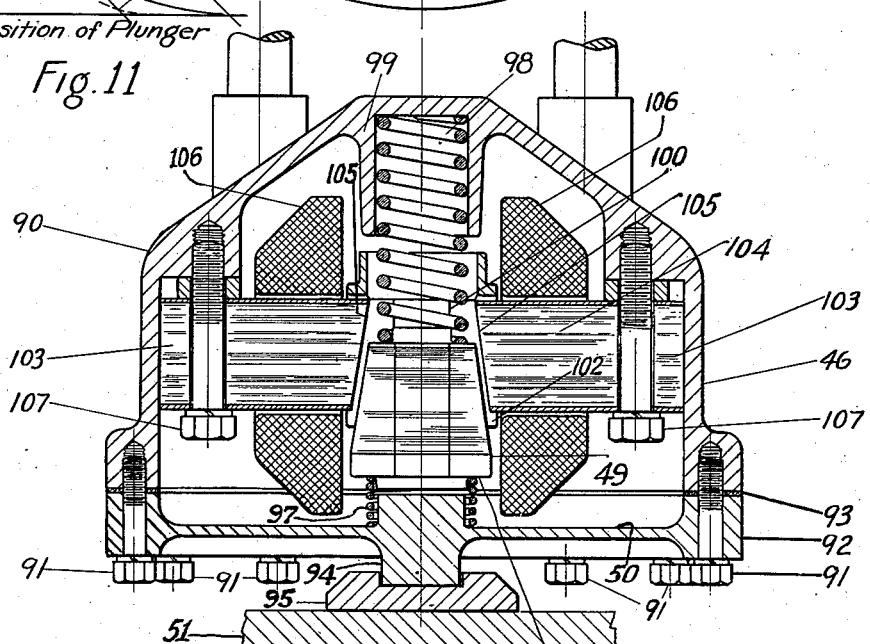
Fig. 11
Fig. 7
INVENTOR.
Edwin E. Turner Jr.
BY
Ezekiel Wolf
ATTORNEY.

Patented Mar. 10, 1936

2,033,160

UNITED STATES PATENT OFFICE 2,033,160

METHOD AND APPARATUS FOR MEASURING DEPTHS

Edwin E. Turner, Jr., West Roxbury, Mass., assignor to Submarine Signal Company, Boston, Mass., a corporation of Maine Application April 17, 1928, Serial No. 270,660

12 Claims. (Cl. 177—386)

The present invention relates to distance finding, and more particularly perhaps, depth finding by the time of travel method employing a source of sound and a time measuring device for measuring the time interval between the emission of the sound signal and the return of the echo from the bottom of the ocean or the reflecting surface.

The present system contains many advantages over the prior art, both in the ease of obtaining the desired results with a minimum of apparatus with regard to cost, and also with very great accuracy.

As contrasted with some of the prior methods of depth sounding, the present system employs a hammer striker which is designed to have a high damping and high increment of sound amplitude, not so much to prevent continued vibration of the sounder as to provide a device which cooperates with the particular receiving circuit, which also responds to a signal of high increment, as will be explained below. The circuit is similar to the one shown in my copending United States application Serial No. 220,719, filed September 20, 1927, Patent No. 1,991,430.

In prior systems for depth sounding employing the time of travel method it has been common practice to use a sound of sustained vibration and to operate therewith a receiving circuit employing vacuum tubes for making or breaking a current in a discharge indicator. Such a system has been described in the Dorsey Patent No. 1,667,540. This system has proved to be very successful in producing a commercial depth sounding apparatus in which the depth is given automatically and visually without any adjustment on the part of the observer. The observer has only to look at the dial of the indicator and read off the depth. The chief difficulty which has been encountered with this system is the presence of stray signals under certain conditions and the expense of the apparatus due, in part, to the necessity of special means for generating current suitable to operate the sound producer. In the present system the applicant has discovered that he can concentrate practically the entire energy of a great number of vibrations into a single impact vibration and, further, that he can receive this type of signal on a microphone or hydrophone and operate a discharge indicator therewith by means of a special circuit adapted to use efficiently the energy of this single vibration. While the receiving circuit may possibly be tuned, it will and does operate without tuning and efficiently uses the potential difference generated by the single impact in controlling an electronic tube circuit for suddenly making or breaking a current to the discharge tube.

The circuit shown in the above mentioned application operates only on a rapid change of current and only once until it is restored. To accomplish this the increment of the signal must be high and similar to that of the receiving circuit. This is provided by a single powerful impact which has a definite force. This single sound impact, when echoed, acts on the receiving circuit and causes the transient phenomenon which operates the indicating mechanism.

Not only is it possible to eliminate stray signals, since only this particular type of impact is capable of operating the receiving circuit, but it is also possible to obtain more accurate measurements than hertofore since, instead of having to build up the signal received by one or two oscillations, as was formerly necessary in many cases and perhaps in all cases, the present signal receiver will operate on the single impact, which definitely fixes the time of the receipt of the echo or received signal.

Besides this, the present type of mechanism eliminates all need of high frequency generators and elaborate switch-boards to run oscillators, so called, which have been used to create sustained but short vibrations in this work.

The present system is designed chiefly for stability, long life, low cost, few repairs, something which can be installed upon a vessel and run continuously, if desired, by unskilled operators and give excellent results.

Without enumerating all the advantages and features of this new system as they will appear from the description below, I shall now describe the embodiment shown in the drawings, in which:

Figure 3 shows a side view of the mechanism of Figure 2, looking from the left;

Figure 4 shows a section on the line 4—4 of Figure 3 in the direction indicated;

Figure 5 shows a detail;

Figure 7 shows a vertical section through the striker;

Figure 8 shows a top view of the striker with the outer casing removed;

Figure 11 illustrates a feature of the design of the striker.

Figure 1:
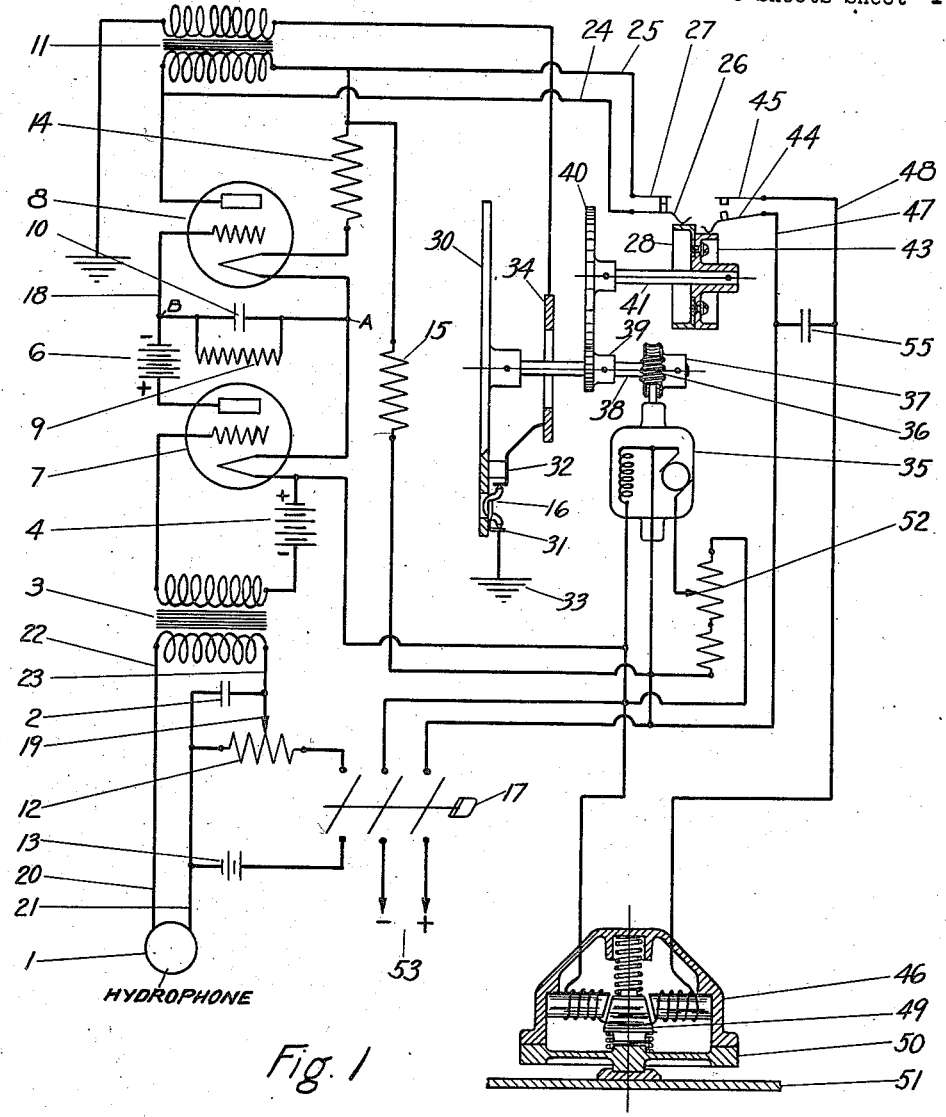
Figure 1 represents a diagrammatic view of the entire system.

In Figure 1, 1 is a hydrophone or other sound receiver capable of receiving the sound impulse for ultimately operating the indicator 16. Connected across the hydrophone 1 is the primary of a transformer 3, one lead 22 of which connects directly to a terminal 20 of the hydrophone 1, while the other lead 21 is connected through an adjustable direct current source 13 in the following manner. The battery 13, when the switch 17 is closed, is connected across the potentiometer 12, one side of the potentiometer and the battery being electrically connected to the hydrophone terminals 21. The potentiometer arm 19 is connected to the other terminal 23 of the transformer 3. This arm is also shunted by a condenser 2 to the terminal 21 so that any pulsating variations due to the moving of the potentiometer arm 19 back and forth are not reproduced or indicated upon the indicator 16. The use of the potentiometer in this connection allows a careful adjustment of microphone current, which is found very advantageous in getting just the right current for operating the receiving circuit.

The secondary of the transformer 3 has one lead connecting directly to the grid of the vacuum tube 7, while the other connects to the filament of the same tube through the battery 4, which places a negative potential upon the grid with respect to the filament. The plate of the tube 7 is maintained at a positive potential with respect to the filament by means of the battery 6, which has its positive side connected to the plate and its negative side connected to the filament through the resistance 9 and condenser 10 connected in parallel. The negative side of the battery 6 is also connected with the grid of the tube 8, while the filaments of the two tubes, it will be noted, are connected in series with the resistances 14 and 15, across the direct current power lines. The potential across the resistance 14 serves to make the plate of the tube 8 positive by that amount with respect to the filament. The transformer 11 is connected in the plate circuit of the tube 8 and serves as the output transformer for the circuit. The primary of this transformer is connected by the leads 24 and 25 to the contacts 26 and 27 respectively and is shorted as shown in Figure 1 for a certain period in the revolution of the cam 28, which is at all times except after the sound has been emitted.

The operation of the circuit is the same as that of the operation of the circuit shown in my copending application, Serial No. 220,719, mentioned above.

When the impulse is received by the receiver 1, it is transmitted through the transformer 3 and made to impress a potential upon the grid of the tube 7. When this potential is in the right direction, which in the present circuit is positive, the plate filament current in the tube 7 will increase, and consequently the potential of the point B will drop below the potential of the point A. The grid of the tube 8, which up to this point was the same potential as the filament, will now become negative with respect to it, and if this change is sharp and of the desired intensity, it will instantaneously cut off the plate current in the tube 8.

A rapid breaking or reducing of the plate current in the tube 8 will cause a large voltage across the transformer 11 and compel a breakdown across the indicator 16 which is connected across the secondary of the transformer 11. The indicator 16 is preferably a neon tube which gives an instantaneous glow when an electrical discharge takes place across the electrodes in the tube.

Not every type of signal will operate the indicator, because the receiving circuit used is such that the signal must have a steep increment in order to effect a rapid enough change to induce the proper voltage in the brief time of the taking place of the phenomenon. In the present case, unless the change of potential on the grid of this tube 7 is rapid, the change in the plate current of the tube 7 will not be rapid, and as a result the charge on the condenser 10 may begin to leak off before the phenomenon is complete. The design of the circuit is such that unless the change in the plate current of the tube 7 is very rapid, the potential of the point B with respect to the point A will not decrease sufficiently or sufficiently quickly to cut off or induce a large potential across the transformer 11.

One of the remarkable features of the circuit is that it may be so designed and adjusted that its increment corresponds to that of the sounder and that water noises or other signals will not cause an indication. Whereas in other depth sounding systems there are frequently many strays present, in the present invention this is practically eliminated, since a sound which does not have the same sharpness or increment as the one for which the circuit is designed will not be received.

The sounder used in the present system is of the impact type and produces a signal in which all of the energy is confined in substantially one vibration. To this extent the impact is not a tuned or a periodic vibration and is not, therefore, as in many of the systems previously used a musical note. The receiving circuit in the present system is particularly adapted to receive the type of signal produced by the sender and to operate therewith the indicator, eliminating at the same time stray indications produced by the water noise in the vicinity of the sound receiver. The grid biasing potential 4 in the receiving circuit places such a potential on the grid of the tube 7 that the ordinary water noise will not affect the output circuit of this tube whereas the signal potential which is greater than the water noise produces a positive potential on the grid of the tube 7 and causes a rapid increase of plate current which is reflected to the grid of the tube 8 causing a breakdown in the plate current of that tube. It should be noted that the receiving circuit depends for its operation upon the potential of the grid of the tube 7 which may be and is established in the present circuit by a single sound vibration and not by a number of vibrations as in other types of circuits and upon the steepness of the impulse wave. This comes from the fact that the output circuit is potentially operated and that the rapidity of cut off of the plate current in the tube 8 and in the transformer 11 is dependent upon the rapidity of the increase of negative potential on the grid of the tube 8. The rapidity of this change is dependent upon the change of plate current in the tube 7 and this in turn is dependent upon the rate of change of potential on the grid of the tube 7 which is dependent upon the steepness of the signal wave and its amplitude. Unless the amplitude of the signal wave impresses a positive potential on the grid of the tube 7 sufficient to increase the potential of the grid above the cut off of the plate current, nothing will take place, but when the amplitude of the impulse has surpassed this point, the rate of increase of potential on the grid of the tube 7 will reflect in the rate of change of plate current in the tube 7 and will further be reflected in the rate of change of plate current in the tube 8.

An added feature in the present combination is that the receipt of the signal is one of a single phenomenon and not a steady state condition. That is, the first impulse operates the receiving circuit, if at all, and if it does, the second vibration cannot operate the circuit, since it takes time for the circuit to recover after operation. It is known, therefore, within a single vibration between what points the indicator measures. This is borne out by the steadiness with which the indicated signal in actual measurement stays at one place on the scale when the ship is stationary in still water.

The indicator is mounted on a rotating disc 30 by means of a pair of clips 31 and 32 in a small slot near the edge of the disc. One of the clips 32 serves also as a brush for conducting the signal to the rotating disc. The other clip is grounded to the disc, which is grounded to the frame of the case as indicated by 33 in Figure 1. The clip and brush 32 bears upon the conducting ring 34, which is fixed and which connects to one side of the secondary of the transformer 11, the other side of which is also grounded to the frame of the case of the indicator.

The disc 30 is rotated by means of the motor 35, by means of the worm 36 and the gear 37, the latter being mounted and fixed to the shaft 38 carrying the disc 30. The shaft 38 also carries the gear wheel 39, which meshes with the gear wheel 40. The gear wheel 40 carries a shaft 41, upon which is mounted the cams 28 and 43 for controlling the operation of the sounding mechanism.

The disc is designed to make three revolutions to one of the cams 28 and 43. The cam 28 controls the indicator and short circuits it at all times except after the sounder has emitted its signal and until just before the contacts 44 and 45 close. It takes, therefore, three revolutions of the disc 30 to complete a sounding cycle.

During substantially two revolutions of the indicator it is made non-operative and during these two revolutions the hammer is pulled up and allowed to drop, whereupon the contacts 26 and 27 are opened immediately. The position of the cams shown in Figure 1 is when the striker has sounded and the indicator has not yet been made operative. The indicator is made operative depending upon the spacing of the sounder and receiver at the moment when the direct signal at the receiver has just passed by. In this manner the effect of the direct signal is entirely eliminated.

At the moment when the contacts 44 and 45 are closed, if the switch 17 is closed current will be impressed upon the sounder 46 by means of the leads 47 and 48. When these contacts are again open, the hammer 49, which had been previously drawn up, will be released and strike the diaphragm 50, imparting through inpact a vibration to the diaphragm 51, which may be the skin of a vessel. A condenser 55 is provided for preventing the sparking across the contacts 44 and 45. The motor 35 has its armature connected across a potentiometer 52, which in turn is connected across the power supply line 53.

In Figures 2, 3, 4 and 6 is shown the indicating mechanism. The mechanism is contained within a casing 60, the cover 61 of which may be removed by the removal of the machine screws 62, 62, 62, 62. The cover 61 holds the glass plate 63, which is in front of the graduated disc 65 and the opening 64 for the reed 66 of the frequency meter, which will be described below.

An opening is provided in the lower part of the casing for the three controls which are mounted within the casing.

The cover 61 may in this way be removed and the mechanism exposed without removing any wires or controlling mechanism. In this manner, inspection and repairs upon a ship can easily be made by the inspector. The mechanism further provides facilities of easy repairs and inspection.

The back half of the casing 60 has four supports 67 extending from the back of the casing. Upon these supporting arms is mounted a frame 68 carrying the entire mechanism within the casing. The frame 68 has four supporting legs positioned to rest upon the supporting legs 67. Machine bolts 70 pass through the legs 69 and hold the frame 68 firmly upon the supports 67. The frame 68 has cast or made integral with it a bearing 71 and another bearing 72 which carry all the rotating mechanism. In the bearing 71 are two roller or ball bearings 73 and 74, in which rest the shaft 38 carrying at one end the worm gear 37 and at the other end the disc 30 and the small gear 39. The motor 35 is mounted on a platform 75 which is supported by an arm 76 extending from the frame 68. The end of the armature shaft 77 has a worm 36 which meshes with the worm gear 37 to drive the rotating mechanism.

The disc 30 carried on the shaft 38 is provided with radial bars 79 which are permanently magnetized iron or nickel. These bars, as the disc 30 is rotated, pass beneath the reeds 66, which are each tuned to a particular frequency so that when the speed of the disc is correct the middle reed will vibrate with the largest amplitude. If the frequency is slightly off from the right one, the reed either to the left or right of the middle one will vibrate with maximum amplitude, depending upon whether it is higher or lower than it should be.

The gear 39, which is mounted on the shaft 38, meshes with the gear 40, which turns the shaft 41 carrying the cams 28 and 43. The gearing is such that the cams 28 and 43 make one revolution to three of the disc 30, thus providing ample time to draw up the hammer and release it in making the measurement. The cams 28 and 43 are so constructed that the contacts 26 and 27 and 44 and 45 are gradually closed and sharply opened. For this purpose the cam gradually rises and suddenly drops after the finger 80 has passed beyond the point 81. The contact 26 is of the spring type and its tension forces the contact back as soon as the restraining pressure is released.

The disc 30 is held to the shaft 38 by means of the plate 82, which is pinned at 83 to the shaft. To allow easy adjustment of the disc 30 for the zero of the scale or to remove it and use another scale, the disc is held to the plate by machine screws 84 which pass through an elongated slot 85 in the disc and hold the disc firmly by means of washers 86. In this way, if the zero on the scale does not correspond to the zero of the indicator, the scale may be moved back and forth a bit until the proper zero is obtained.

Figure 2:
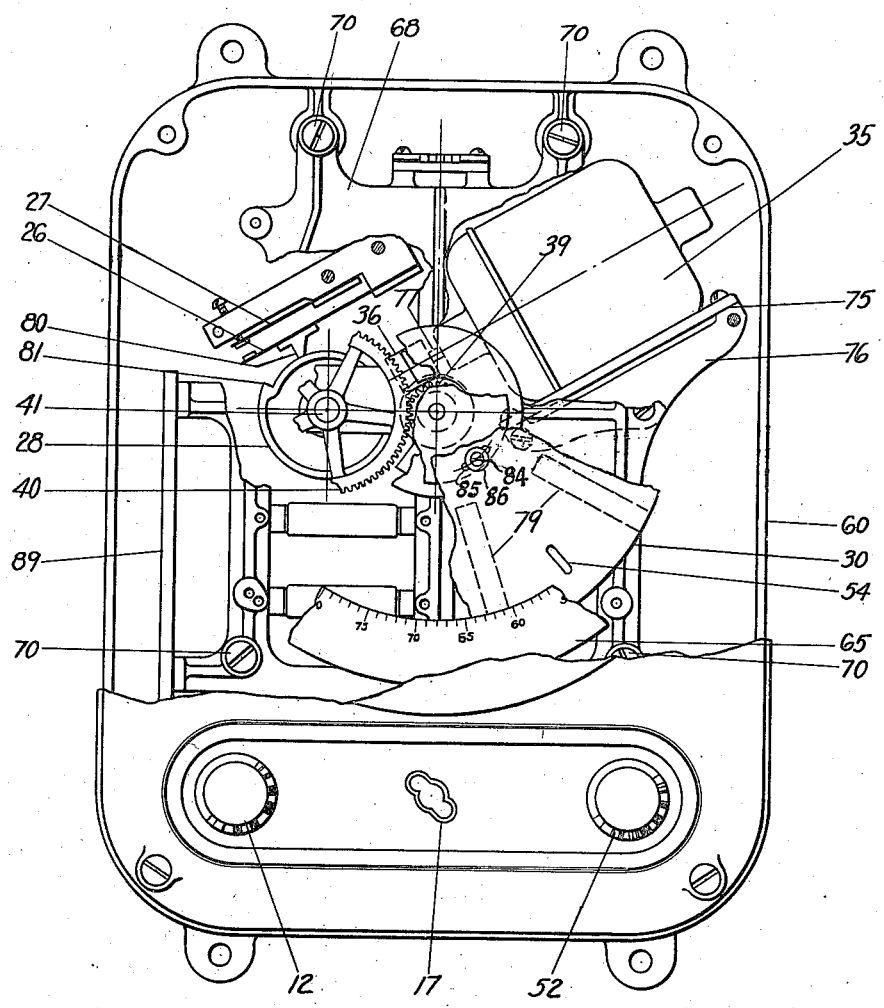
Figure 2 shows a front view of the indicating and meauring device with the front casing partly removed.
Figure 6:
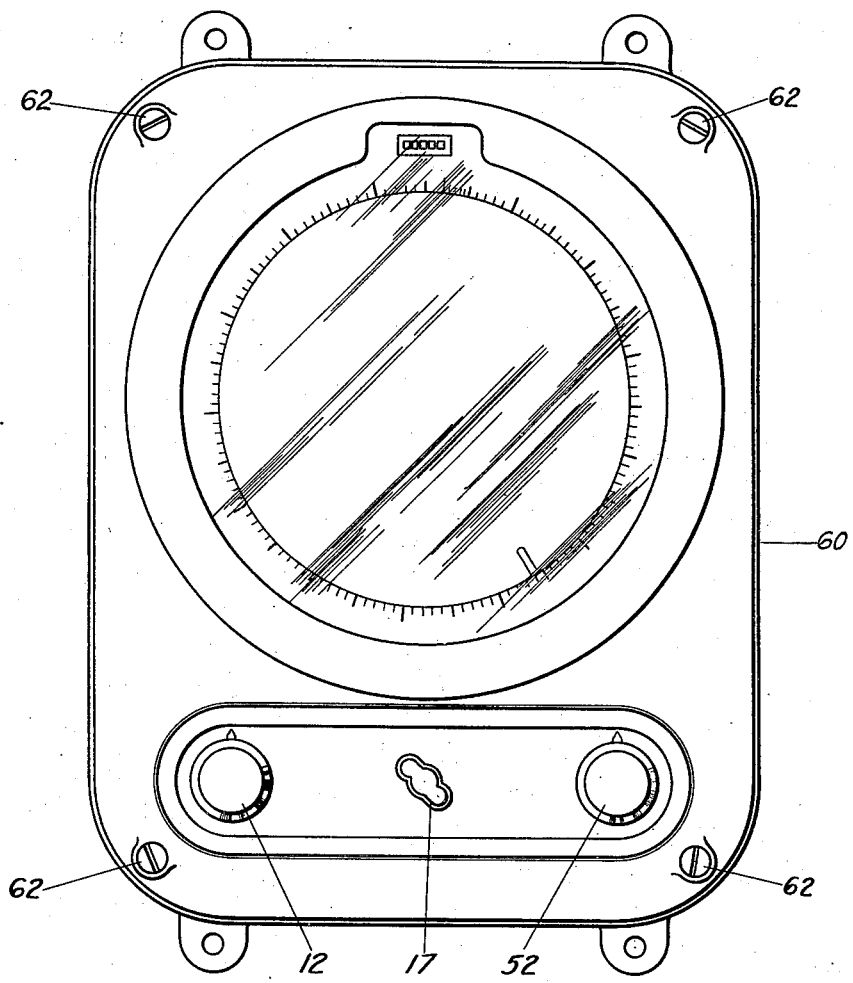
Figure 6 shows a front view of the indicating mechanism.
Figure 10:
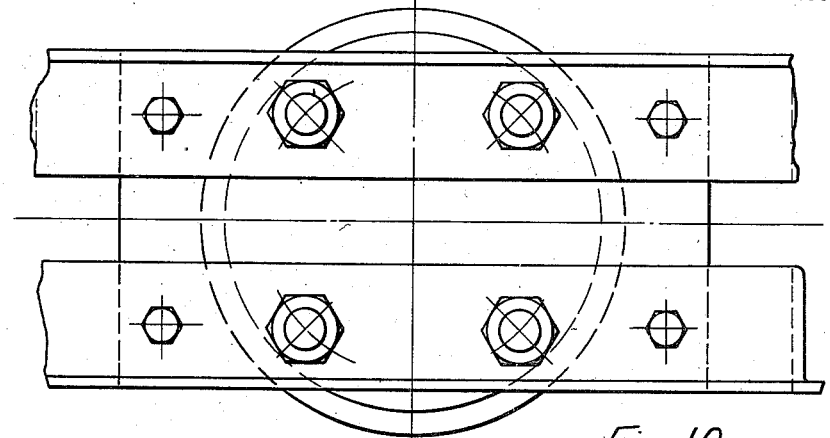
Figure 10 shows a detail of the mounting.
Figure 9:
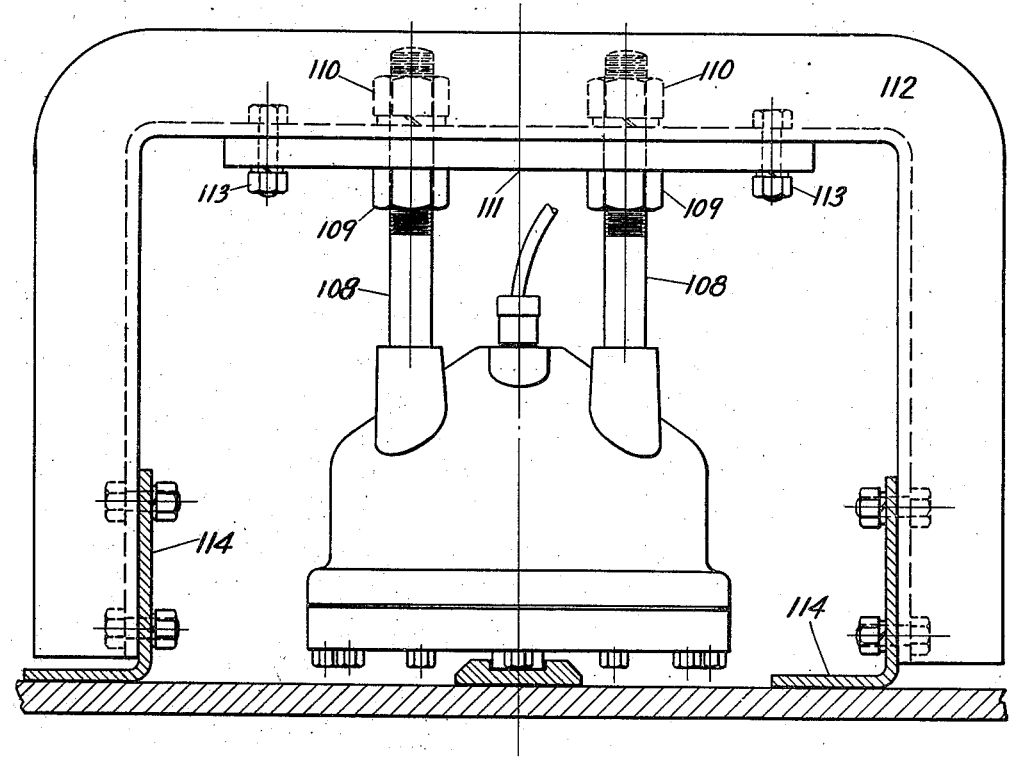
Figure 9 shows the mounting of the striker.

The scale 65 shown in Figures 2 and 6 is mounted on the supports 87, which are a part of the frame 68, and it is calibrated from zero to the depth for which the instrument is designed to operate. This may vary within a certain range, but for the most part the system is to be used for depths shallower than 300 fathoms, which depths are usually of greatest interest to ships in indicating the approach of land and guiding in channels and shoal water.

The construction of the indicating apparatus, it will be noted, allows a mechanic to get at the various elements without great difficulty for inspection and repairs if necessary. No wires come off with the front cover or the casing, so that there is no danger even if an inexperienced mechanic tried to open the indicator casing.

Besides this, the indicator is easily readable and simply operated, the whole mechanical parts being of much less weight than those heretofore used. If desirable, also, the inside mechanism may be removed and a new one substituted. For this purpose, an inspector may have with him a spare inside mechanism and substitute it if necessary. Or repairs may be made entirely at a shop, the inspector merely replacing the inside mechanism if it does not work properly. This will always insure operation of the device, besides allowing rapid repair of the system in the event that there is little time before the ship is leaving.

A single cable 88 comes through the cable head 87 and has all the wires for operating the complete system. These wires connect directly to the switchboard 89 (Fig. 2), which is also mounted on the frame 68. All the operator has to do to remove the inside mechanism is to disconnect these wires.

The striking mechanism is shown in detail in Figures 7, 8, 9 and 10. It is also shown in Figure 1. It comprises a diaphragm 50, which is held securely against the edge of a casing 90 by means of the machine bolts 91 which pass through a heavy flange 92 at the edge of the diaphragm. Between the casing and the flange 92 is a watertight gasket 93 to keep out the water from the interior of the casing, if necessary, although it is designed to operate in air with the diaphragm imparting the impulse to the ship's skin, as will be explained below.

At the center of the diaphragm is a boss 94 which extends on both sides of the diaphragm. On the outside it sets in a cap 95 which rests, without being rigidly held, against the ship's skin 51. On the inside it has a flat surface opposing the striker 49, which latter element in its operation hits the boss 94 to impart a sound vibration to the skin 51 and thereby to the water. Between the collar 96 and the shoulder of the boss 94 rests a helical spring 97 which is designed so that the forcing helical spring 98 will cause one blow to be given to the diaphragm and no more. The resistance of the spring 97 is just strong enough to prevent a second blow. The forcing spring 98 rests in a cup 99 at the top of the casing and bears against the striker 49. The spring is centered on the striker by the core 100. The striker 49 rests in ways or grooves 101 and 102, shown clearly in Figure 8. This maintains it in a central position for operation.

A laminated core 104 is made up of the laminations 103, which are circular stampings having two radial projections to form the poles 105, 105 across which the magnetic flux flows. The laminations are held together and to the casing by means of the machine bolts 107. Two solenoid coils 106, 106 are provided for generating this flux. When current is passed through the coils, the space between the poles becomes strongly magnetic and draws up the striker 49 against the spring 98. When the current is released the spring 98 forces the striker down against the boss 94 which imparts a blow to the ship's skin 51 and thus to the water.

The diaphragm 50 is made very thin and the spring 97 just strong enough to prevent a second impact of the striker against the boss 94. The clearance between the striker 49 and the boss 94 is small, yet of sufficient size to allow the striker an acceleration before hitting the diaphragm 50. The diaphragm is not set firmly in the piece 95 nor is the latter held firmly against the ship's skin 50, so that the impact may be sharp and not opposed before its full force is impressed on the skin 51. These features allow an impact having a sharp decrement to be obtained.

Another feature of the striker is illustrated in Figure 11.

In the design of the ordinary striker, it has been found that the mechanism will operate fairly well for a time and then it will stick. This is due to the change in temperature of the mechanism which causes the copper to heat and cuts down the effective current. The magnetization is, therefore, reduced and whereas initially the curve of the pull of the magnet plotted as ordinate against the position of the plunger is the curve A, after continuous operation it may be and sometimes is the curve B. The curve representing the resultant force of the spring forces is a straight line obeying Hooke's law and is shown as C. It will be noted that while the curve A is continuously above the line C, the curve B drops below it, which means that between E and F the resultant force of the springs is in excess of the magnet pull on the plunger. The magnet cannot pull the plunger up and it will therefore stick.

To avoid this difficulty and to obtain, as well, a constant resultant force, the coil and magnetic circuit is designed so that the flux curve will always be above saturation, as shown by the curve D. By running above saturation, the force curve becomes a straight line and is everywhere above the resultant spring force, so that the magnet never sticks. This insures reliable and at the same time accurate operation of the sound producing means.

It is necessary in the present system to have special means for mounting the striking mechanism, as the contact of the boss 94 and the piece 95 against the skin of the vessel need adjustment in each case. For this purpose, the sound producer is provided with four threaded studs 108 which extend from the top of the sound producer casing and which are provided with nuts 109 and 110. The studs 108 pass through a plate 111 which is bolted to the angle iron 112 by means of the bolts and nuts 113 and the nuts 109 and 110. The nuts 109 may be adjusted along the stud to obtain just the right tension of the boss 94 and the piece 95 against the ship's skin. The nuts 110 are brought up tight with split washers beneath them, so as to hold the sound producing mechanism rigidly in place. Two angle irons 112 are used to hold the sound producer and these are bolted to the frames 114 or otherwise secured to the vessel.

Without going further into the operation of the system, which has been explained in connection with the various elements of the system, and which it is believed is now well understood,

I claim as my invention:

1. A system for measuring depths including an impact striker for generating a single sharp sound impulse, a receiver for receiving said sound impulse after reflection from the object or surface whose depth is to be measured, an indicator, and means for operating said indicator comprising a receiving circuit interposed between said receiver and said indicator and having a thermionic three electrode control valve, the grid of which is provided with a biasing potential adjusted for the operation of the circuit just above the noise level.

2. A system for measuring depths or distances including an impact striker for generating a single sharp sound impulse, means for receiving said sound impulse after reflection from the object or surface whose depth is to be measured, an indicator and means for operating said indicator comprising a circuit interposed between the receiver and indicator and having an electronic valve the control grid of which is provided with a biasing potential adjusted for the operation of the circuit just above the noise level.

3. A system for measuring depths or distances including an impact striker for generating a single sharp sound impulse, means for receiving said sound impulse after reflection from the object or surface whose depth is to be measured, an indicator and means for operating said indicator comprising a circuit interposed between the receiver and the indicator, said circuit having two thermionic valves, the first of which has a grid biasing potential set at the level of the noise which is to be eleminated, and an impedance coupling said first valve with the second including a capacity in shunt for limiting the time of recovery of said circuit.

4. A system for measuring depths or distances including an impact striker for generating a single sharp sound impulse, means for receiving said sound impulse after reflection from the object or surface whose depth is to be measured, an electric discharge indicator and an electronic valve circuit interposed between said receiver and said indicator having an initial valve with a grid biasing control potential therefor, a second valve, and means coupling circuits of said valves providing in shunt a capacity in the grid circuit of the second valve for preventing the sudden recovery of said circuit and a repeated discharge of said indicator.

5. A system for measuring depths or distances including an impact striker for generating a single impulse, means for receiving said sound impulse after reflection from the object whose distance is to be measured, an indicator, means for operating said indicator comprising a circuit interposed between the receiver and indicator and having an electronic valve the control grid of which is provided with a biasing potential adjusted for the operation of the circuit just above the noise level and means for adjusting the sensitivity of the received signal including means for controlling the polarizing receiver current.

6. In a system for measuring distance and depth in a field where local noise is generated the combination of means for producing an impact, microphonic receiving means, an indicator and means for operating said indicator including an untuned vacuum tube circuit having a grid bias control of a magnitude above that generated by the local noises.

7. In a system for measuring distance and depth in a field where local noise is generated the combination of means for producing an impact, means for receiving sound vibrations, an indicator and means for operating said indicator including a vacuum tube circuit having a grid bias control of a magnitude above that generated by the local noises.

8. In a system for measuring distance and depth in a field where local noise is generated the combination of means for producing an impact, means for receiving sound vibrations, an electric discharge indicator and means for operating said indicator including an untuned vacuum tube circuit having a constant plate current flowing in one tube thereof and means for suddenly interrupting said plate current including a second tube for impressing a sudden potential on said first tube, said second tube having its input connected to said receiver and having a grid biasing potential of a magnitude above that generated by the local noises.

9. In a system for measuring distance and depth in a field where local noise is generated the combination of means for producing an impact, means for receiving sound vibrations, a discharge indicator and means for operating said indicator including a vacuum tube circuit having a grid bias control of a magnitude above that generated by the local noise.

10. A system for measuring depths in the presence of extraneous noises which comprises means for generating a sharp compressional wave impulse having an amplitude far above the noise level, means for receiving the impulse after reflection from the object whose distance is to be measured, a receiving circuit operatively connected to said receiver, said circuit being untuned and including a thermionic valve control means having cathode, anode and grid provided with a negative potential adjusted to the point to prevent anode current flow by action of compressional waves of a magnitude not substantially greater than the extraneous noises, indicating means, means adapted to operate said indicating means only upon a sudden variation of current therethrough, means connected with said last means for establishing a variation in current in said operating means said means being coupled with said cathode and said anode and responding to a potential built up by the current therein flowing when the signal impressed on said grid overcomes the point to prevent anode current flow.

11. A system for measuring depths in the presence of extraneous noises which comprises an impact oscillator for producing an impulse having an amplitude far above the noise level, means for receiving the impulse after reflection from the object whose distance is to be measured, a receiving circuit operatively connected to said receiver, said circuit including a thermionic valve control means having cathode, anode and grid provided with a negative potential adjusted to the point to prevent anode current flow by action of compressional waves of a magnitude not substantially greater than the extraneous noises, indicating means, means adapted to operate said indicating means only upon a sudden variation of current therethrough, means connected with said last means for establishing a variation in current in said operating means, said means being coupled with said cathode and said anode and responding to a potential built up by the current therein flowing when the signal impressed on said grid overcomes the point to prevent anode current flow.

12. A system for measuring depths in the presence of extraneous noises which comprises means for generating a sharp compressional wave impulse having an amplitude far above the noise level, means for receiving the impulse after reflection from the object whose distance is to be measured, an untuned thermionic tube and circuit having cathode, anode and grid, the grid circuit thereof being directly coupled with said receiver and having a potential bias adjusted to the point to prevent anode current flow by action of compressional waves of a magnitude not substantially greater than the extraneous noises, indicating means, a potential transformer adapted to operate said indicating means upon a sudden variation of current therethrough, a vacuum tube and circuit in the output of which said transformer is coupled, means directly coupling in the input of said vacuum tube circuit said anode and cathode whereby a current flowing from said anode to said cathode will impress a potential on the said input and bring about a variation in current in said output.

EDWIN E. TURNER, JR.